United States Patent
Botura

(10) Patent No.: US 9,976,481 B2
(45) Date of Patent: May 22, 2018

(54) DUAL PRESSURE DEICING SYSTEM

(71) Applicant: ROHR, Inc., Chula Vista, CA (US)

(72) Inventor: Galdemir Botura, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 357 days.

(21) Appl. No.: 14/791,085

(22) Filed: Jul. 2, 2015

(65) Prior Publication Data

US 2017/0002736 A1     Jan. 5, 2017

(51) Int. Cl.
| | |
|---|---|
| *F02C 7/047* | (2006.01) |
| *F02C 7/08* | (2006.01) |
| *F01D 25/08* | (2006.01) |
| *F01D 25/02* | (2006.01) |
| *F01D 11/24* | (2006.01) |
| *F02C 6/08* | (2006.01) |

(52) U.S. Cl.
CPC ............. *F02C 7/047* (2013.01); *F01D 11/24* (2013.01); *F01D 25/02* (2013.01); *F01D 25/08* (2013.01); *F02C 6/08* (2013.01); *F02C 7/08* (2013.01); *Y02T 50/672* (2013.01)

(58) Field of Classification Search
CPC .......... F01D 11/24; F01D 25/02; F01D 25/08; F02C 6/08; F02C 7/047; F02C 7/08; B64D 15/04
See application file for complete search history.

(56) References Cited

U.S. PATENT DOCUMENTS

| | | | |
|---|---|---|---|
| 5,114,100 A | 5/1992 | Rudolph et al. | |
| 7,959,109 B2 * | 6/2011 | Dasilva ................ | B64D 15/04 244/134 R |
| 8,843,253 B1 * | 9/2014 | Chapman ............. | B64D 15/22 244/134 R |
| 8,967,528 B2 | 3/2015 | Mackin et al. | |
| 2014/0150902 A1 | 6/2014 | Pirat | |
| 2014/0352324 A1 | 12/2014 | Ernst et al. | |
| 2015/0034767 A1 * | 2/2015 | Pirat .................... | B64D 15/04 244/134 B |

OTHER PUBLICATIONS

Supply House, "Pneumatic Pressure Reducig Valve for Dual Pressure System", Honeywell, PP901B1102, retrieved from http://www.supplyhouse.com/Honeywell-PP901B1002-Pneumatic-Pressure-Reducing-Valve-for-Dual-Pressure-System.

* cited by examiner

*Primary Examiner* — Igor Kershteyn
*Assistant Examiner* — Brian P Wolcott
(74) *Attorney, Agent, or Firm* — Snell & Wilmer, L.L.P.

(57) ABSTRACT

A deicing system for an aircraft may comprise a dual pressure regulating valve. The dual pressure regulating valve may comprise a low pressure setting and a high pressure setting. The low pressure setting may supply a relatively lesser supply of bleed air to an aircraft component, and the high pressure setting may supply a relatively greater supply of bleed air to the aircraft component. The dual pressure regulating valve may be switched between the low pressure setting and the high pressure setting based on aircraft or atmospheric conditions to prevent heat damage to the aircraft component.

9 Claims, 3 Drawing Sheets

DUAL PRESSURE DEICING SYSTEM

FIELD

The present disclosure relates to anti-icing and deicing systems, and more particularly, to pneumatic anti-icing and deicing systems for aircraft nacelles and other aircraft components and surfaces.

BACKGROUND

Inlets for aircraft nacelles, wing leading edges, horizontal stabilizers, vertical fins, and other aircraft components may be subject to ice build-up during flight. A heat source may heat the components to prevent the ice build-up or to remove ice after it has built up. The heat source most commonly used today is hot bleed air, but electric resistance heating is under development by several companies. Engine bleed air may supply hot pressurized air to the deicing system and be applied on the backside of surfaces that may form ice in order to heat the surfaces. A pressure regulating valve may be used to regulate the bleed air supply to a constant pressure in the deicing system. However, the temperature of the bleed air varies based on engine operating conditions. For example, during takeoff, the engine is operating at high throttle, and the bleed air is at a relatively high temperature. Even though the pressure of the bleed air supply is regulated, the temperature of the bleed air and the ultimate temperature of the components heated by the bleed air can vary significantly. Designers must take into account the maximum possible temperature a component may reach with the anti-ice system activated, and this can be a very high temperature under certain extreme conditions. The variability of the temperatures created by the anti-icing and deicing system may drive component designs that are overdesigned for most normal operating conditions, that include high-temperature resistant materials that are expensive and heavy, or that pose inconvenient or undesirable flight limitations. Thus, it would be beneficial if the anti-icing or deicing system could control temperatures more precisely.

Composite materials have various advantageous properties over conventional metal materials. In particular, composite materials may be lighter than metals such as aluminum. However, some composite matrix materials do not perform well at high sustained temperatures. If composite materials are used in areas requiring anti-ice or deice capability, the temperature of the bleed air from the anti-icing or deicing system must ensure that certain maximum temperature allowables are not exceeded. Better thermal management of anti-icing and de-icing systems would facilitate further composite penetration into aircraft structures.

SUMMARY

A deicing system for an aircraft may comprise a bleed air supply line and a first dual pressure regulating valve in fluid communication with the bleed air supply line. The first dual pressure regulating valve may selectively operate between a low pressure setting configured to supply a relatively low mass flow of bleed air to an aircraft component, and a high pressure setting configured to supply a relatively high mass flow of bleed air to the aircraft component.

In various embodiments, the first dual pressure regulating valve may comprise an integrated shut off valve. The deicing system may comprise a shut off valve in series with the first dual pressure regulating valve. A second dual pressure regulating valve may be in parallel with the first dual pressure regulating valve. A FADEC or electronic controller may be configured to command the first dual pressure regulating valve to switch between the low pressure setting and the high pressure setting based on at least one condition. The at least one condition may comprise at least one of compressor pressure, engine RPM, bleed air temperature, or weight-on-wheels. The at least one condition may comprise at least one of ambient temperature or atmospheric humidity. The aircraft component may comprise at least one of an inlet for a nacelle or a leading edge of an aircraft wing.

An aircraft nacelle may comprise an inlet and a first dual pressure regulating valve configured to supply bleed air to the inlet. The first dual pressure regulating valve may comprise a first pressure setting configured to supply a first pressure of bleed air to the inlet, and a second pressure setting configured to supply a second pressure of bleed air to the composite inlet.

In various embodiments, the first dual pressure regulating valve may comprise a third pressure setting configured to supply a third mass flow of bleed air to the composite inlet. In response to an engine RPM increasing, the first dual pressure regulating valve may be configured to switch from the first pressure setting to the second pressure setting. The first dual pressure regulating valve may comprise an integrated shut off valve. A shut off valve may be in series with the first dual pressure regulating valve. A second dual pressure regulating valve may be in parallel with the first dual pressure regulating valve. A FADEC may be configured to command the first dual pressure regulating valve to switch from the first pressure setting to the second pressure setting in response to a change in an aircraft condition.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Preventing ice build-up is typically referred to as "anti-icing," while removing ice build-up already attached to the aircraft surface is "deicing." Throughout the remainder of this specification, "deicing" will be used to mean both deicing and anti-icing systems.

Engine bleed air may be used to impinge on the backside of aircraft components and heat the aircraft components to melt ice or prevent ice build-up. A dual pressure regulating valve may be used to regulate the pressure of the bleed air supply in the deicing system. The dual pressure regulating valve may have a low pressure setting which results in a relatively lesser mass flow of air (i.e., mass of air per unit time) though the valve, and a high pressure setting which results in a relatively greater mass flow of air through the valve. The high or low pressure setting may be selected based on a variety of aircraft conditions. When a smaller amount of deicing capability (i.e., heat added to a surface per unit time) is desired, the low pressure setting may be used. The low pressure setting may provide less heat flux to the aircraft components, and result in lower operating temperatures for the component, and may extend the life of the component or permit more advantageous components designs to be used.

Figure 1:
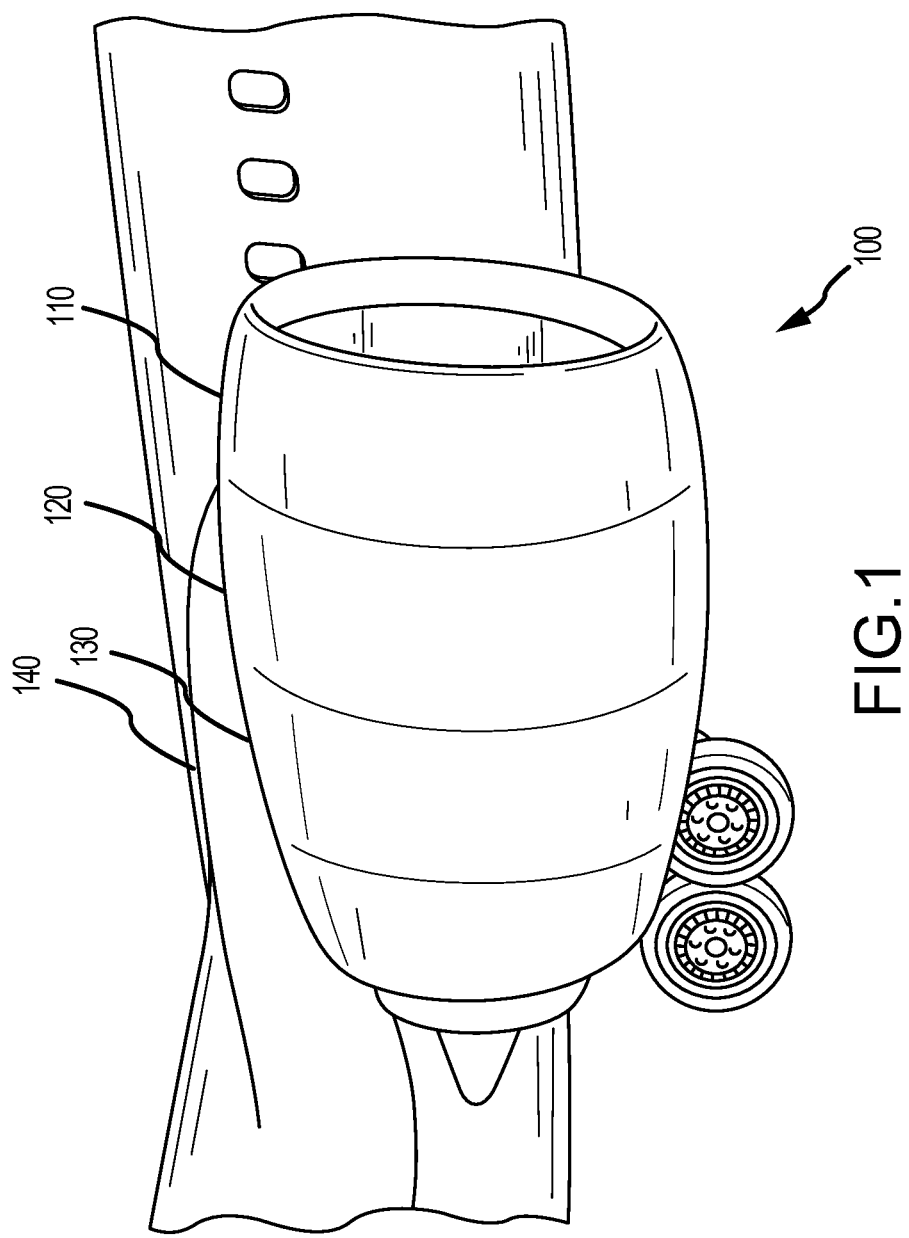
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. The nacelle 100 may be disposed about a centerline, which may also be the axis of rotation of an engine located within the nacelle 100. Ice may build up on the inlet 110. A bleed air heater may heat the backside of inlet 110 or other aircraft components in a known manner in order to prevent ice from forming or to melt ice present on the inlet 110 or on portions of the aircraft wing or aircraft body, as illustrative examples.

Figure 2:
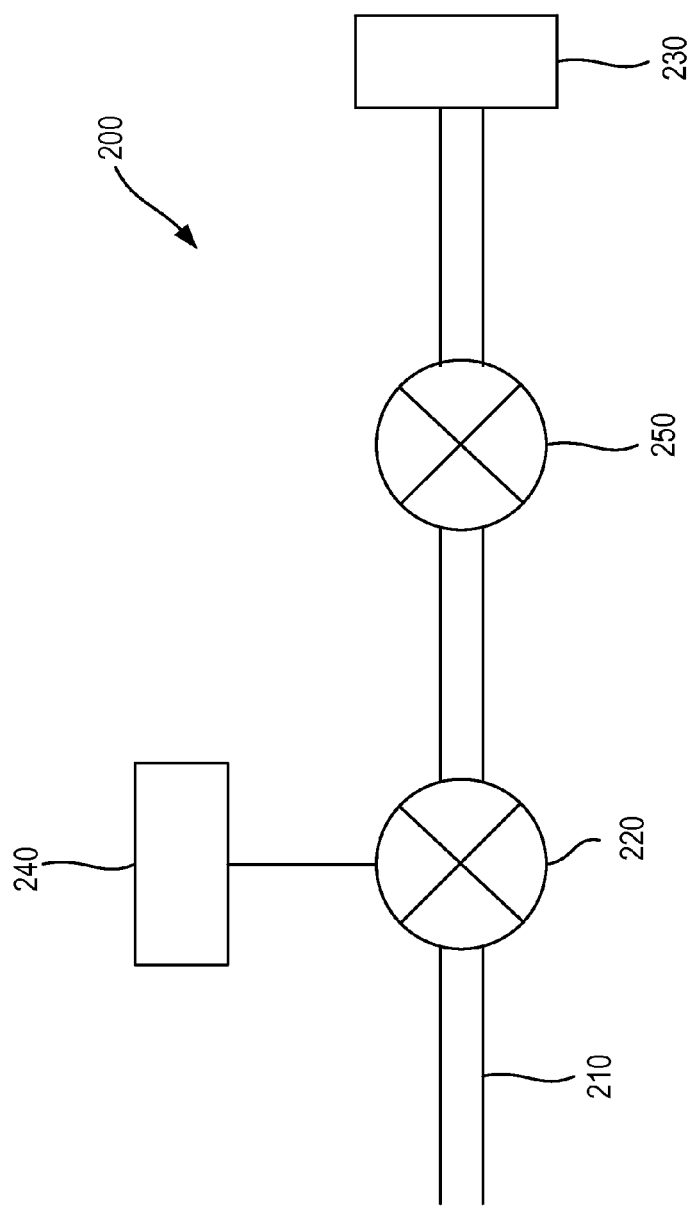
FIG. 2 illustrates a schematic view of a deicing system in accordance with various embodiments.

Referring to FIG. 2, a schematic view of a deicing system 200 is illustrated according to various embodiments. The deicing system 200 may comprise a bleed air supply line 210. The bleed air supply line 210 may receive bleed air from the compressor section of a gas turbine engine located within an aircraft nacelle. The bleed air may be compressed and heated in the compressor section. A dual pressure regulating valve 220 may control the mass flow of bleed air being supplied to an aircraft component 230. The aircraft component 230 may be a composite component which is subject to icing, such as an inlet for a nacelle or a leading edge of an aircraft wing. The bleed air may heat the aircraft component 230 to prevent ice build-up. The dual pressure regulating valve 220 may have a high pressure setting and a low pressure setting. In other embodiments, the dual pressure regulating valve 220 may have any number of pressure settings. In the high pressure setting, the dual pressure regulating valve 220 may allow a relatively greater mass flow of air to pass through the dual pressure regulating valve 220, and in the low pressure setting, the dual pressure regulating valve 220 may allow a relatively lesser mass flow of air to pass through the dual pressure regulating valve 220. The dual pressure regulating valve 220 may comprise any number of pressure settings, wherein the dual pressure regulating valve 220 is configured to allow a different mass flow of air to pass through the dual pressure regulating valve 220 for each pressure setting.

The bleed air pressure supplied by the engine to the valve 220 may range from 50 pounds per square inch (psi) (340 kPa) at engine idle to 300 psi (2100 kPa) at maximum throttle. In the low pressure setting the dual pressure regulating valve 220 may regulate the pressure of bleed air supplied to the deicing system to 20 psi to 40 psi (140 kPa to 280 kPa), as an illustrative example. In the high pressure setting, the dual pressure regulating valve 220 may regulate pressure of bleed air supplied to the deicing system to 60 psi to 100 psi (410 kPa to 690 kPa), as an illustrative example. However, those skilled in the art will appreciate that valves may be designed to any suitable pressures based on desired operating ranges.

During conditions where the bleed air is at a relatively high temperature, such as from 800° F. to 1200° F. (430° C. to 650° C.), or during atmospheric conditions where the chance of ice build-up is less severe, a lesser mass flow of air may be desired to provide the deicing effect on the aircraft component 230. The reduced thermal flux resulting from the lesser mass flow will result in lower operating temperatures for the deiced component. Similarly, during conditions where the bleed air is at a relatively low temperature, such as from 400° F. to 800° F. (200° C. to 430° C.), or during atmospheric conditions where the chance of ice build-up is more severe, a greater mass flow of air may be desired to provide the deicing effect on the aircraft component 230. A full authority digital engine control (FADEC) 240 or other electronic controller may monitor engine and atmospheric conditions and command the dual pressure regulating valve 220 to switch between the low pressure setting and the high pressure setting based on the conditions. For example, in various embodiments, the FADEC 240 may select the low pressure setting or the high pressure setting based on at least one of compressor pressure, engine revolutions per minute (RPM), bleed air temperature, weight-on-wheels, altitude, ambient temperature, atmospheric humidity, geographic location, or any other suitable condition which may affect icing conditions.

In various embodiments, the dual pressure regulating valve 220 may comprise an integrated shut off valve. A pilot may turn the deicing system 200 off, in which case the dual pressure regulating valve 220 may close. The pilot may turn the deicing system 200 on, in which case the dual pressure regulating valve 220 may be in either the low pressure setting or high pressure setting based on input from the FADEC 240 or other input source. In various embodiments, the deicing system may comprise a shut off valve 250 which is in series with and independent from the dual pressure regulating valve 220. The shut off valve may be opened or closed to turn on or off the deicing system 200.

In the event of failure of the dual pressure regulating valve 220, a mechanic may lock the dual pressure regulating valve 220 in either the low pressure setting or the high pressure setting. Thus, the dual pressure regulating valve 220 may still provide deicing capabilities even if the dual pressure regulating valve 220 is unable to switch between the high pressure setting and the low pressure setting. The shut off valve 250 may be switched open or closed in order to turn the deicing system 200 on or off.

Figure 3:
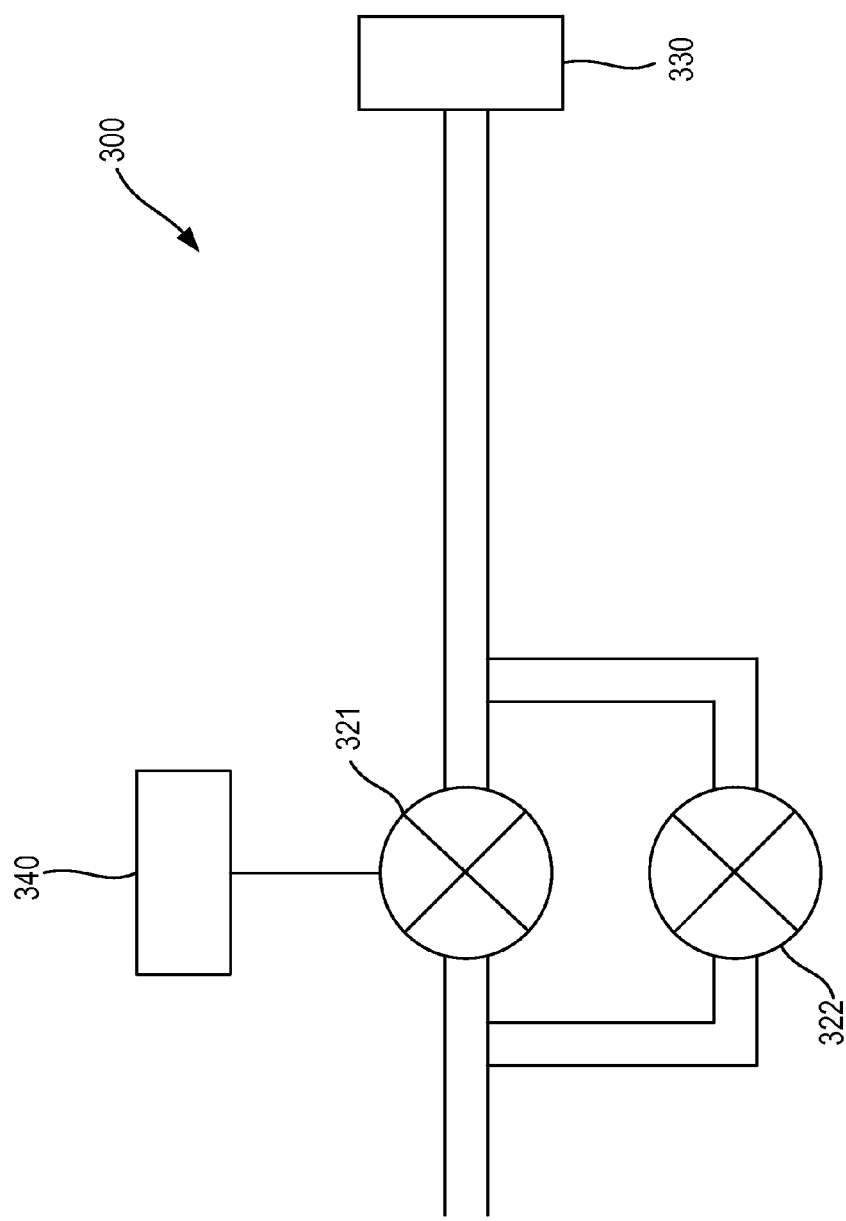
FIG. 3 illustrates a schematic view of a deicing system with dual pressure regulating valves in parallel in accordance with various embodiments.

Referring to FIG. 3, a schematic view of a deicing system 300 with two dual pressure regulating valves in parallel is illustrated according to various embodiments. The deicing system 300 is similar to deicing system 200 in FIG. 2, with the exception of an additional dual pressure regulating valve. A first dual pressure regulating valve 321 may be in parallel with a second dual pressure regulating valve 322. The second dual pressure regulating valve 322 may be used for redundancy in the event of failure of the first dual pressure regulating valve 321 or vice versa. Each dual pressure regulating valve 321, 322 may comprise a low pressure setting and a high pressure setting. In various embodiments, each dual pressure regulating valve 321, 322 may comprise an integrated shut off valve. However, in various embodiments, a separate shut off valve may be in series with each dual pressure regulating valve 321, 322. During normal operation, one of the dual pressure regulating valves 321, 322 may be closed in a shut off position, and the other dual pressure regulating valve 321, 322 may be switched between the low pressure setting, the high pressure setting, or the shut off position depending on conditions monitored by the FADEC 340. In the event of failure of one dual pressure regulating valve 321, 322, the failed dual pressure regulating valve 321, 322 may be locked in the shut off position, and the other dual pressure regulating valve 321, 322 may be switched between the high pressure setting, the low pressure setting, and the shut off position in order to supply heat to the aircraft component 330 as desired to melt ice or prevent the build-up of ice.

Similarly, dual pressure regulating valves 321, 322 may be arranged in series for redundancy. In the event of failure of one dual pressure regulating valve 321, 322, the failed dual pressure regulating valve 321, 322 may be locked in the fully open position, and the other dual pressure regulating valve 321, 322 may be switched between the high pressure setting, the low pressure setting, and the shut off position in order to supply heat to the aircraft component 330 as desired to melt ice or prevent the build-up of ice.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. A deicing system for an aircraft comprising:
    a bleed air supply line; and
    a first dual pressure regulating valve comprising an integrated shut off valve in fluid communication with the bleed air supply line;
    wherein the first dual pressure regulating valve selectively operates between a low pressure setting configured to supply a relatively lesser mass flow of bleed air to an aircraft component, and a high pressure setting configured to supply a relatively greater mass flow of bleed air to the aircraft component, and further comprising a second dual pressure regulating valve in parallel with the first dual pressure regulating valve.

2. The deicing system of claim 1, further comprising at least one of a full authority digital engine control (FADEC) or electronic controller configured to command the first dual pressure regulating valve to switch between the low pressure setting and the high pressure setting based on at least one condition.

3. The deicing system of claim 2, wherein the at least one condition comprises at least one of compressor pressure, engine revolutions per minute, bleed air temperature, or weight-on-wheels.

4. The deicing system of claim 2, wherein the at least one condition comprises at least one of ambient temperature or atmospheric humidity.

5. The deicing system of claim 1, wherein the aircraft component comprises at least one of an inlet for a nacelle or a leading edge of an aircraft wing.

6. An aircraft nacelle comprising:
    an inlet; and
    a first dual pressure regulating valve comprising an integrated shutoff valve configured to supply bleed air to the inlet, wherein the first dual pressure regulating valve comprises a first pressure setting configured to supply a first pressure of bleed air to a deicing system that deices the inlet, and a second pressure setting configured to supply a second pressure of bleed air to the deicing system, and further comprising a second dual pressure regulating valve in parallel with the first dual pressure regulating valve.

7. The aircraft nacelle of claim 6, wherein the first dual pressure regulating valve further comprises a third pressure setting configured to supply a third mass flow of bleed air to the inlet.

8. The aircraft nacelle of claim 6, wherein in response to an engine RPM increasing, the first dual pressure regulating valve is configured to switch from the first pressure setting to the second pressure setting.

9. The aircraft nacelle of claim 6, further comprising a FADEC configured to command the first dual pressure regulating valve to switch from the first pressure setting to the second pressure setting in response to a change in an aircraft condition.

\* \* \* \* \*